United States Patent
Lu et al.

(10) Patent No.: US 11,987,241 B2
(45) Date of Patent: May 21, 2024

(54) MONOTONIC PATH TRACKING CONTROL FOR LANE KEEPING AND LANE FOLLOWING

(71) Applicant: GM Global Technology Operations LLC, Detroit, MI (US)

(72) Inventors: Jimmy Zhong Yan Lu, Markham (OM); Mohammadali Shahriari, Markham (OM); Reza Zarringhalam, Whitby (OM)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 854 days.

(21) Appl. No.: 17/078,320

(22) Filed: Oct. 23, 2020

(65) Prior Publication Data
US 2022/0126823 A1    Apr. 28, 2022

(51) Int. Cl.
*B60W 30/12* (2020.01)
*B60W 60/00* (2020.01)

(52) U.S. Cl.
CPC .......... *B60W 30/12* (2013.01); *B60W 60/001* (2020.02); *B60W 2510/202* (2013.01); *B60W 2520/14* (2013.01)

(58) Field of Classification Search
CPC .............. B60W 30/12; B60W 60/001; B60W 2510/202; B60W 2520/14; B60W 30/02; B62D 6/04; B62D 15/025
See application file for complete search history.

(56) References Cited

U.S. PATENT DOCUMENTS

| | | | |
|---|---|---|---|
| 2015/0246687 A1* | 9/2015 | Takeda | B62D 15/025 701/41 |
| 2016/0075334 A1* | 3/2016 | Terazawa | B62D 15/025 701/41 |

\* cited by examiner

*Primary Examiner* — Thomas Ingram
(74) *Attorney, Agent, or Firm* — CANTOR COLBURN LLP

(57) ABSTRACT

An autonomous vehicle and a system and method for operating the autonomous vehicle. The system includes a sensor and a processor. A disturbance force or yaw moment is received on the autonomous vehicle. The sensor measures a position of the autonomous vehicle within a lane of a road with respect to road boundaries and lane markings. The processor is configured to resist an effect of a disturbance force or yaw moment received on the autonomous vehicle. The processor minimizes a tracking error between a path of the autonomous vehicle and an initial track lane, wherein resisting the effect creates an inflection point in the path of the autonomous vehicle, establishes a final track lane at a closer of a lateral position of the inflection point and a lane center to the initial track lane, and tracks the path to the final track lane.

20 Claims, 8 Drawing Sheets

MONOTONIC PATH TRACKING CONTROL FOR LANE KEEPING AND LANE FOLLOWING

INTRODUCTION

The subject disclosure relates to autonomous or active-safety assisted vehicles and, in particular, to a system and method for lane control for an autonomous or active-safety assisted vehicle in a presence of a lateral disturbance force or yaw moment on the autonomous vehicle.

An autonomous vehicle includes a path tracking system that maintains the vehicle along a selected track lane within a lane of a road. However, in the presence of a disturbance, such as a transient lateral force or yaw moment in the direction of lane center, the vehicle will drift away from the track lane and toward the lane center. The path tracking system will resist the disturbance and correct the vehicle trajectory to track the initial path, causing the vehicle to move towards an outer edge of the lane. This correction can be undesirable and disconcerting to a passenger of the vehicle. Accordingly, it is desirable to prevent this correction from occurring.

SUMMARY

In one exemplary embodiment, a method of operating an autonomous vehicle is disclosed. A disturbance force or yaw moment is received on the autonomous vehicle that causes a path of the autonomous vehicle to deviate toward a lane center of a road and away from an initial track lane being tracked by the autonomous vehicle, the initial track lane being parallel to the lane center. The effect of the disturbance force or yaw moment is resisted by minimizing a tracking error between the path of the autonomous vehicle and the initial track lane, wherein resisting the effect creates an inflection point in the path of the autonomous vehicle. A final track lane is established at a closer of a lateral position of the inflection point and a lane center of the road to the initial track lane. The path is tracked to the final track lane.

In addition to one or more of the features described herein, the final track lane is between the lane center and the initial track lane. The method further includes receiving the disturbance force or yaw moment when the autonomous vehicle is making a correction to track the path of the vehicle to the initial track lane from a location outside of the initial track lane. The method further includes applying a monotonic tracking condition to the vehicle to prevent an increase in an offset between path of the vehicle and the lane center. The autonomous vehicle resists the effect of the disturbance force or yaw moment via a steering torque on the autonomous vehicle. The disturbance force or yaw moment is transient and externally applied. The method further includes maintaining tracking of the path to the final track lane when the disturbance force or yaw moment is removed.

In another exemplary embodiment, a system for operating an autonomous vehicle is disclosed. The system includes a sensor and a processor. The sensor measures a position of the autonomous vehicle within a lane of a road with respect to road boundaries and lane markings. The processor is configured to resist an effect of a disturbance force or yaw moment by minimizing a tracking error between a path of the autonomous vehicle and an initial track lane, wherein resisting the effect creates an inflection point in the path of the autonomous vehicle, establish a final track lane at a closer of a lateral position of the inflection point and a lane center to the initial track lane, and track the path to the final track lane.

In addition to one or more of the features described herein, the final track lane is between the lane center and the initial track lane. The disturbance force or yaw moment is received at the autonomous vehicle when the autonomous vehicle is making a correction to the path to track the path to the initial track lane from a location outside of the initial track lane. The processor enforces a monotonic tracking condition that prevents an increase in an offset between the path of the vehicle and the lane center. The autonomous vehicle resists the effect of the disturbance force or yaw moment by applying a steering torque on the vehicle. The disturbance force or yaw moment is transient and externally applied. The processor is further configured to maintain tracking of the path to the final track lane when the disturbance force or yaw moment is removed.

In yet another exemplary embodiment, an autonomous vehicle is disclosed. The autonomous vehicle includes a sensor and a processor. The sensor measures a position of the autonomous vehicle within a lane of a road and with respect to road boundaries and lane markings. The processor is configured to resist an effect of a disturbance force or yaw moment by minimizing a tracking error between a path of the autonomous vehicle and an initial track lane, wherein resisting the effect creates an inflection point in the path of the autonomous vehicle, establish a final track lane at a closer of a lateral position of the inflection point and a lane center to the initial track lane, and track the path to the final track lane.

In addition to one or more of the features described herein, the final track lane is between the lane center and the initial track lane. The disturbance force or yaw moment is received at the autonomous vehicle when the autonomous vehicle is making a correction to the path to track the path to the initial track lane from a location outside of the initial track lane. The processor enforces a monotonic tracking condition that prevents an increase in an offset between the path of the vehicle and the lane center. The disturbance force or yaw moment is transient and externally applied. The processor is further configured to maintain tracking of the path to the final track lane when the disturbance force or yaw moment is removed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
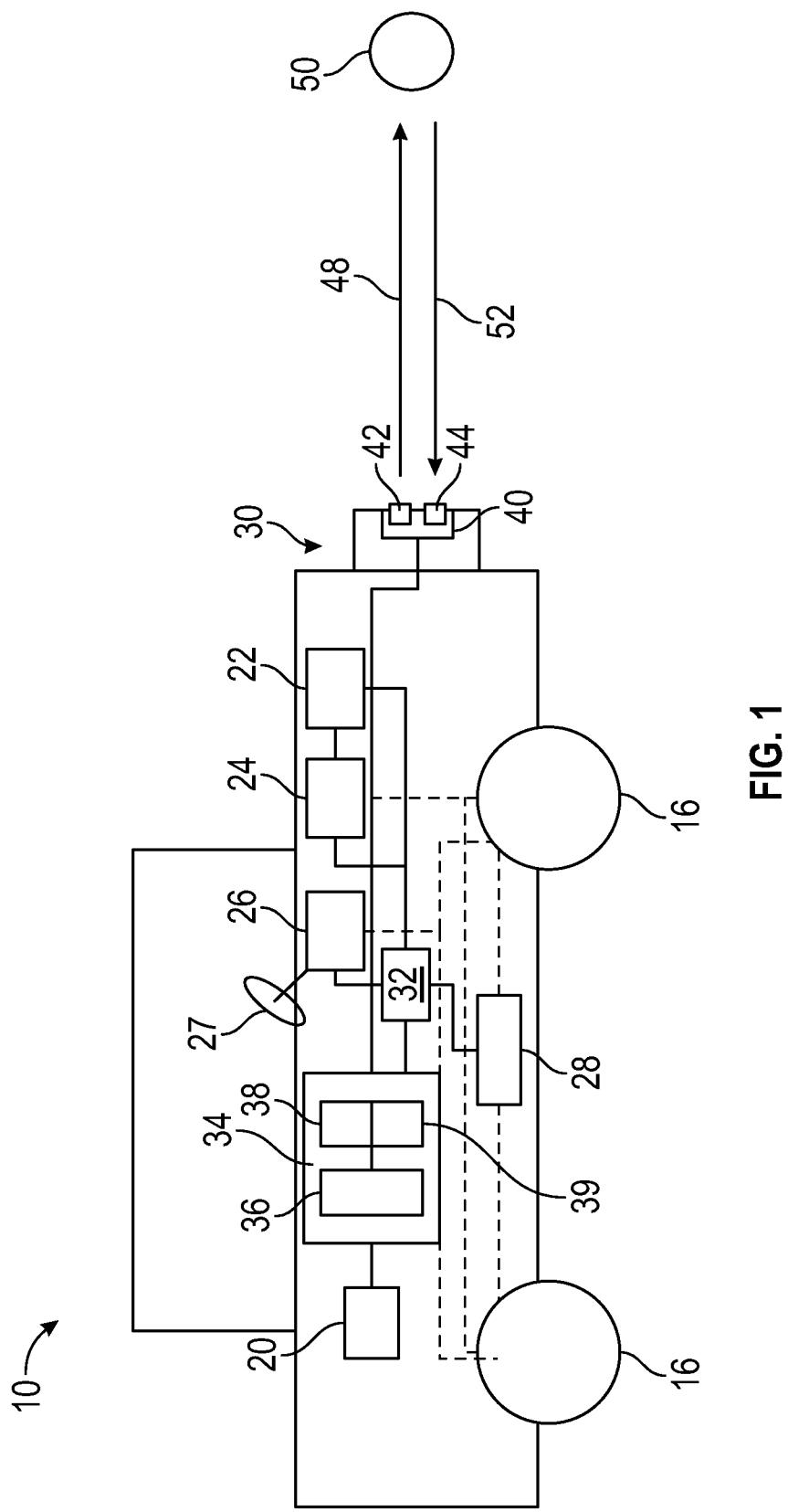
FIG. 1 shows an autonomous vehicle, in an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle 10 operating at any of the levels One through Five. In various embodiments, the autonomous vehicle 10 is an active-safety assisted driving vehicle.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a radar system 40 that senses objects in an exterior environment of the autonomous vehicle 10 and provides various parameters of the objects useful in locating the position and relative velocities of various remote vehicles in the environment of the autonomous vehicle. Such parameters can be provided to the controller 34. In operation, the transmitter 42 of the radar system 40 sends out a radio frequency (RF) reference signal 48 that is reflected back at the autonomous vehicle 10 by one or more objects 50 in the field of view of the radar system 40 as one or more reflected echo signals 52, which are received at receiver 44. The one or more echo signals 52 can be used to determine various parameters of the one or more objects 50, such as a range of the object, Doppler frequency or relative radial velocity of the object, and azimuth, etc. The sensor system 30 includes additional sensors, such as digital cameras, for identifying road features, etc.

The controller 34 builds a trajectory for the autonomous vehicle 10 based on the output of sensor system 30. The controller 34 can provide the trajectory to the actuator system 32 to control the propulsion system 22, transmission system 24, steering system 26, and/or brake system 28 in order to navigate the autonomous vehicle 10 with respect to the object 50. The controller 34 can operate a tracking program that tracks a path of the autonomous vehicle 10 to a track lane of a road and controls the lateral position of the autonomous vehicle with respect to the track lane. The tracking program measures a lateral offset of the path of the autonomous vehicle 10 with respect to a lane center, determines the lateral offset of the track lane to the lane center and makes a correction to the path when a difference between these lateral offsets exceeds a selected threshold. The controller 34 also performs various operations disclosed herein for adjusting the track lane when an externally applied force or disturbance pushes the autonomous vehicle 10 towards the lane center.

The controller 34 includes a processor 36 and a computer readable storage device or storage medium 38. The computer readable storage medium 38 includes programs or instructions 39 that, when executed by the processor 36, operate the autonomous vehicle 10 based on sensor system outputs. The computer readable storage medium 38 may further include programs or instructions 39 that, when executed by the processor 36, perform the various methods disclosed herein.

Figure 2:
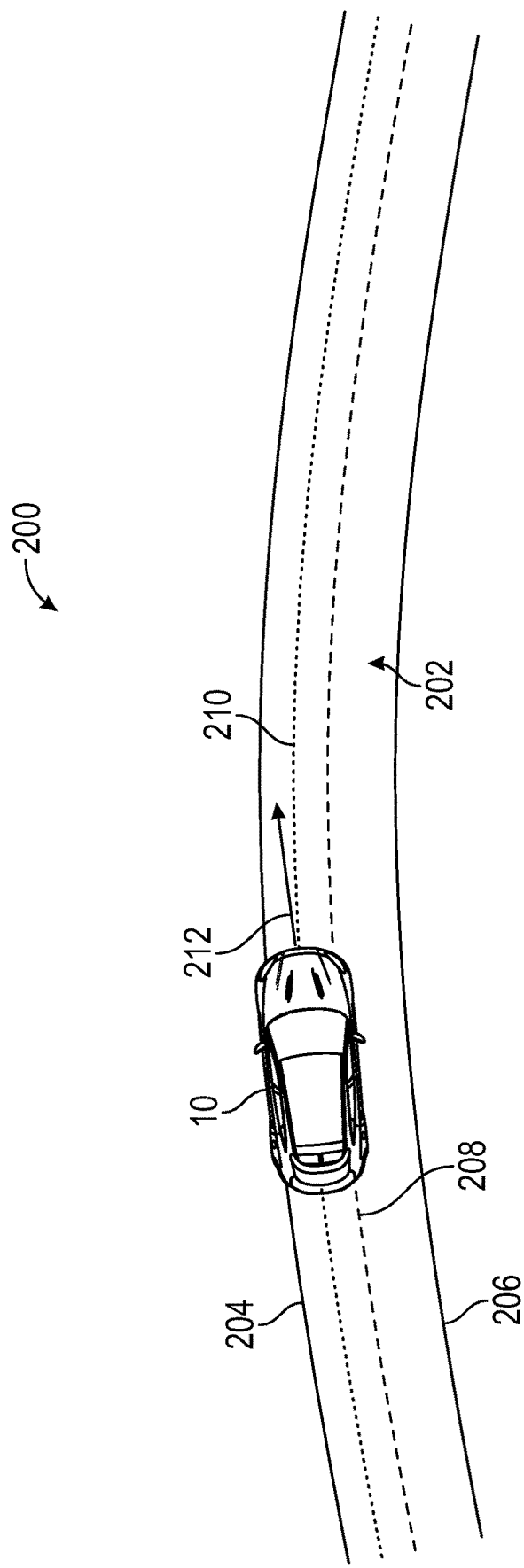
FIG. 2 shows a top view of a section of a roadway.

FIG. 2 shows a top view 200 of a section of a roadway. The roadway includes a road lane 202 having a left edge 204 and a right edge 206. The left edge 204 can be indicated by a left edge marker and the right edge 206 can be marked by a right edge marker. A lane center 208 indicates points that are midway between the left edge 204 and the right edge 206. An autonomous vehicle 10 is shown traveling along the road lane 202. The illustrative road lane 202 curves to the right in the direction of travel of the autonomous vehicle 10. Thus, the left edge 204 can be referred to as an outer edge of the road lane 202 and the right edge 206 can be referred to as an inner edge of the road lane 202. For a road lane curving to the left (not shown), the left edge 204 can be referred to as an inner edge and the right edge 206 can be referred to as an outer edge.

For a straight road lane, the autonomous vehicle 10 can select to use the lane center 208 as a track lane and therefore navigate the road lane 202 by matching its own path to the lane center. For a curved road lane, such as road lane 202 of FIG. 2, the autonomous vehicle 10 can define a track lane (i.e., a first or initial track lane 210) that is away from the lane center 208 and navigate the road lane 202 by matching its path to the track lane. The initial track lane 210 is shown to an outside of the lane center 208 (i.e., between the lane center 208 and the left edge 204 of the road lane 202). A region inside of the lane center 208 is between the lane center 208 and the right edge 206 of the road lane 202. The autonomous vehicle 10 is shown with a velocity vector 212 oriented along a tangent line of the initial track lane 210. However, the path of the autonomous vehicle 10 can deviate toward the left edge 204 of the road lane 202 and toward the right edge 206 of the road land 202 while it tracks the initial track lane 210 during normal operations. When this happens, the processor 36 can perform a correction to realign the path with the initial track lane 210.

Figure 3:
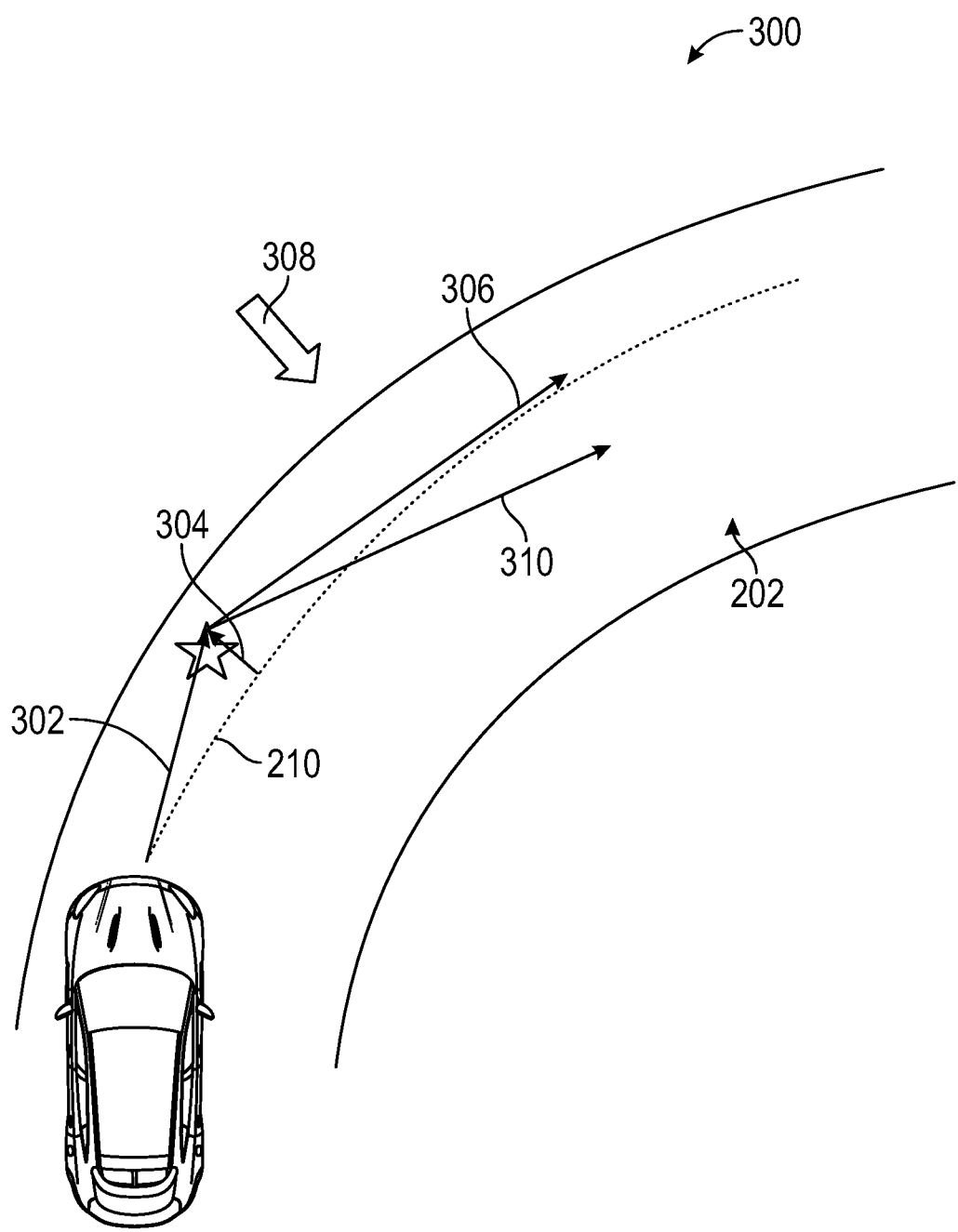
FIG. 3 shows a top view of the road lane illustrating an effect of a disturbance on a path tracking operation of the autonomous vehicle.

FIG. 3 shows a top view 300 of the road lane 202 illustrating an effect of a disturbance on a path tracking operation of the autonomous vehicle 10. The autonomous vehicle 10 is shown tracking the initial track lane 210. The path 302 of the autonomous vehicle 10 is shown to have a lateral deviation from the initial track lane 210 as shown by deviation 304. When a magnitude of the deviation 304 is greater than a selected threshold, the tracking program performs a path correction that realigns the path 302 to the initial track lane 210, thereby reducing the deviation 304. Return path 306 shows a corrective path that is taken by the tracking program to realign the path to the initial track lane 210.

Also shown in FIG. 3 is a disturbance force 308, such as a sudden gust of wind or other unexpected externally applied disturbance that produces a disturbance force 308 on the autonomous vehicle 10. The disturbance force 308 can produce a yaw moment on the autonomous vehicle 10 as it moves along the return path 306. A combination of tracking efforts of autonomous vehicle 10 to along return path 306 and the disturbance force 308 causes the autonomous vehicle 10 to overshoot the initial track lane 210 by moving away from the left edge 204 and toward the lane center 208, as shown by overshoot trajectory 310. The overshoot trajectory 310 places the autonomous vehicle 10 to the inside of the initial track lane 210 (i.e., between the initial track lane 210 and the lane center (not shown) with at least a component of the overshoot trajectory 310 being in a direction of the lane center 208

While the autonomous vehicle 10 can perform an additional corrective action to align the undershot path with the initial track lane 210, such additional corrective action can move the autonomous vehicle 10 once again outside of the initial track lane 210, especially if the lateral disturbance disappears as the autonomous vehicle 10 performs the additional corrective action. Such correcting to the outside can be unsettling to a passenger. The methods disclosed with respect to FIGS. 4-7 perform a tracking operation that absorbs the disturbance force 308 rather than attempting to counter its effects.

Figure 4:
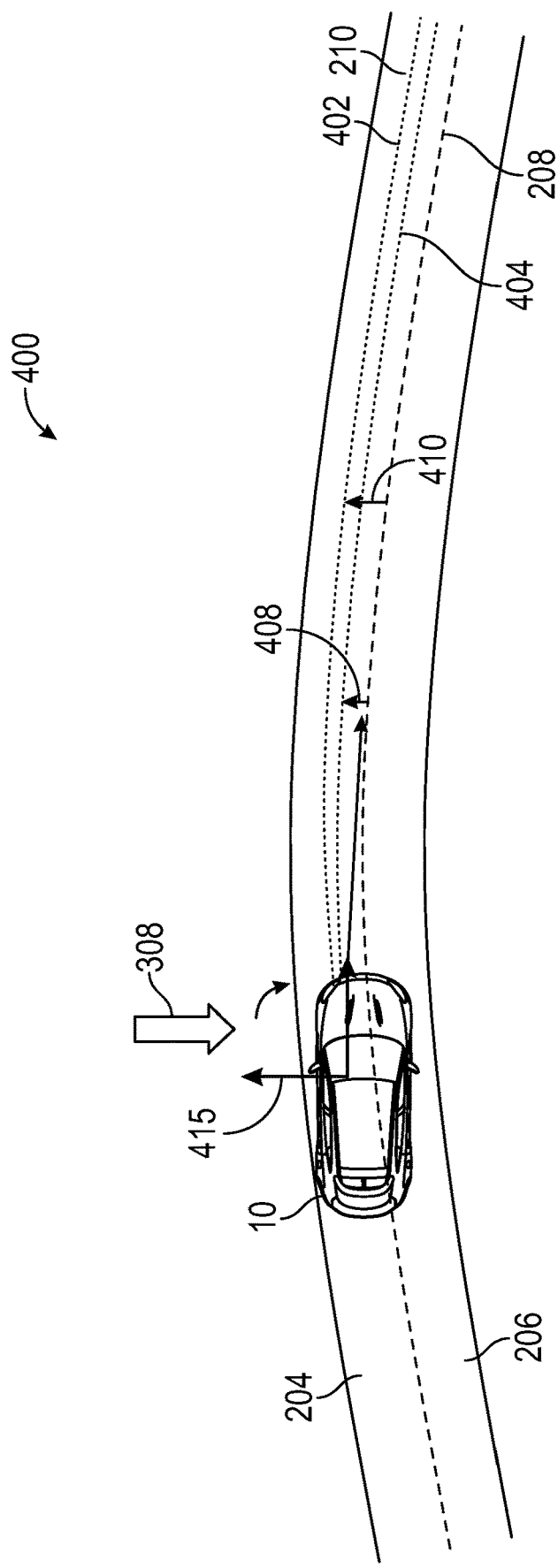
FIG. 4 illustrates a process by which the autonomous vehicle responds to the lateral disturbance, in an embodiment.

FIG. 4 illustrates a process by which the autonomous vehicle 10 responds to the lateral disturbance 308, in an embodiment. The autonomous vehicle 10 is shown travelling along the initial track lane 210. The autonomous vehicle 10 generates a target lane 402 that is aligned with the initial track lane 210. The autonomous vehicle 10 also generates a preview path 404 that shows a predicted path of the autonomous vehicle 10 based on vehicle dynamics, such as location, velocity, heading angle, etc. The processor 36 measures a lateral deviation between the preview path 404 and the target lane 402 to keep the autonomous vehicle 10 aligned to the initial track lane 210. In particular, the processor 36 measures a target lateral offset 408 ($\Delta y_{target}$) of the target lane 402 with respect to lane center 208 and measures a preview lateral offset 410 ($\Delta y_{preview}$) of the preview path 404 with respect to the lane center 208. Corrective actions are performed based on a difference between the preview lateral offset 410 and the target lateral offset 408.

Determining these offsets includes tracking the lane center 208. Within a vehicle-centered coordinate system 415, the lane center 208 can be parameterized by Eq. (1):

$$y_c = c_0 + c_1 x + c_2 x^2 + \ldots \quad \text{Eq. (1)}$$

where $y_c$ is a lateral coordinate of the lane center 208 within the road, x is a longitudinal coordinate along the road, $c_0$ is an offset of the lane center, $c_1$ is a heading of the lane center, and $c_2$ is the second polynomial coefficient term of the lane center. The target lane 402 is related to the lane center 208 by Eq. (2):

$$y_{target} = y_c - \Delta y_{target} \quad \text{Eq. (2)}$$

A curvature of the lane center 208 is given by Eq. (3):

$$\kappa_c \approx -2c_2 \quad \text{Eq. (3)}$$

A relative heading angle $\psi$ between the direction of the autonomous vehicle 10 and a tangent line of the lane center 208 to the location of the autonomous vehicle 10 is given by Eq. (4):

$$\psi \approx -c_1 \quad \text{Eq. (4)}$$

The autonomous vehicle 10 tracks the target lane 402 to the initial track lane 210 using a monotonic tracking condition to ensure the lateral deviation between the autonomous vehicle 10 and the lane center does not increase a deviation. The monotonic tracking condition is indicated by Eq. (5):

$$\frac{\partial |y_c|}{\partial t}\bigg|_{|\tau_c|>0} \leq 0 \quad \text{Eq. (5)}$$

where $\tau_c$ is an applied steering torque on the autonomous vehicle 10.

The tracking program tracks the preview path to the target lane over time, which is segmented into a series of time steps (k) separated by a constant time interval or time step $\Delta t_s$. At each time step, the processor 36 makes a check for conditions under which the path tracking system is to correct the path of the autonomous vehicle 10. The conditions under which the processor 36 activates a lane realignment procedure are shown in Eqs. (6) and (7):

$$|c_0| < |\Delta y_{target_{k-1}}| - \Delta y_{thr} \quad \text{Eq. (6)}$$

$$\text{sgn}(\psi) == -\text{sgn}(\Delta y_{target_{k-1}}) \quad \text{Eq. (7)}$$

where $\Delta y_{target_{k-1}}$ is the lateral offset of the target lane 402 during a previous time step (k−1) and $\Delta y_{thr}$ is a defined threshold. The term $\text{sgn}(\Delta y_{target_{k-1}})$ is equal to +1 when the target lane 402 is to the right of the lane center 208 during a previous time step and is equal to −1 when the target lane is to the left of the lane center 208 during the previous time step. The term sgn($\psi$) is equal to +1 when the autonomous vehicle 10 heading is to the right of the target lane 402 and is equal to −1 when the vehicle heading is to the left of the target lane.

When the conditions of Eq. (6) and Eq. (7) are met, the autonomous vehicle 10 calculates the preview path for the current time step (k), as shown in Eq. (8):

$$\Delta y_{preview_k} = \Delta y_{preview_{k-1}} + \psi V_x \Delta t_s \quad \text{Eq. (8)}$$

The lateral offset of the preview path is bounded from below by the lane center 208, as shown in Eq. (9):

$$|\Delta y_{preview_k}| \geq 0 \quad \text{Eq. (9)}$$

At the same time, the target lane 402 is kept constant from the previous time step to the current time step, as shown in Eq. (10):

$$\Delta y_{target_k} = \Delta y_{target_{k-1}} \quad \text{Eq. (10)}$$

The target lane 402 is kept constant in order to resist the effects of the disturbance force 308.

Figure 5:
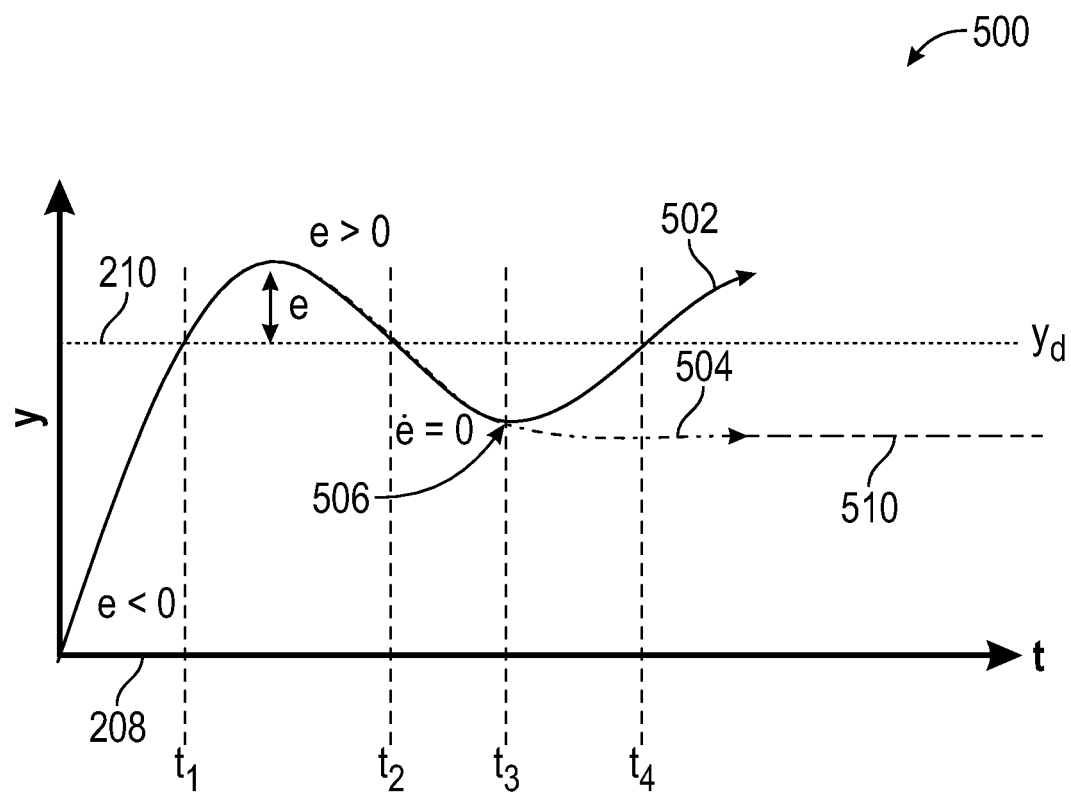
FIG. 5 shows a graph depicting illustrative paths taken for the autonomous vehicle using the methods disclosed herein.

FIG. 5 shows a graph 500 depicting illustrative paths taken for the autonomous vehicle 10 with and without using the methods disclosed herein. Time is shown along the abscissa and lateral offset is shown along the ordinate axis. A first curve 502 indicates a path taken by the autonomous vehicle 10 in response to a transient lateral disturbance or transient disturbance force without using the method disclosed herein. A second curve 504 indicates a path taken by the vehicle in response to the transient lateral disturbance or transient disturbance force using the method disclosed herein. The initial track lane 210 is shown at a constant lateral displacement from the lane center 208.

The first curve 502 shows the autonomous vehicle 10 initially drifting outside of the initial track lane 210 between times $t_1$ and $t_2$ and making an appropriate correction. Between times $t_2$ and $t_4$, the first curve 502 initially overshoots the target lane to the inside of the initial track lane 210 and makes a correction to return to the initial track lane 210. Due to the correction taken between times $t_2$ and $t_4$, the first curve 502 passes through an inflection point 506 at time $t_5$. Due to the lessening or removal of the transient lateral disturbance, the first curve goes to the outside of the initial track lane 210 after time $t_4$. An error function e is calculated as a difference between a lateral offset of the first curve 502 at a selected time and a lateral offset of the initial track lane 210. The error function is negative (e<0) before the first time $t_1$ and positive between the first time $t_1$ and second time $t_2$. The inflection point 506 (i.e., e=0) that occurs when the first curve is between the initial target lane and the lane center is indicated at time $t_5$.

The second curve 504 follows the same path as the first curve 502 until time $t_5$. At time $t_5$, the first curve 502 passes through the inflection point 506. The processor 36 calculates the path of the curve to determine the inflection point 506 and then generates a second or final track lane 510 at the lateral offset of the inflection point 506. The processor 36 then reassigns the target lane 402 to the preview path from the previous time step, as shown in Eq. (11):

$$\Delta y_{target_k} = \Delta y_{preview_{k-1}} \qquad \text{Eq. (11)}$$

Assigning the target lane 402 to the previous path as shown in Eq. (11) aligns the autonomous vehicle to the final track lane 510. After time $t_5$, the autonomous vehicle 10 follows the final track lane 510 by tracking the second curve 504 to the target lane, which has been reassigned to the final track lane 510. The final track lane 510 can be tracked using the monotonic tracking condition shown in Eq. (5). By following the final track lane 510, the autonomous vehicle 10 is prevented from rebounding to the outside of the curve, as shown by the section of the first curve after time ta.

Figure 6:
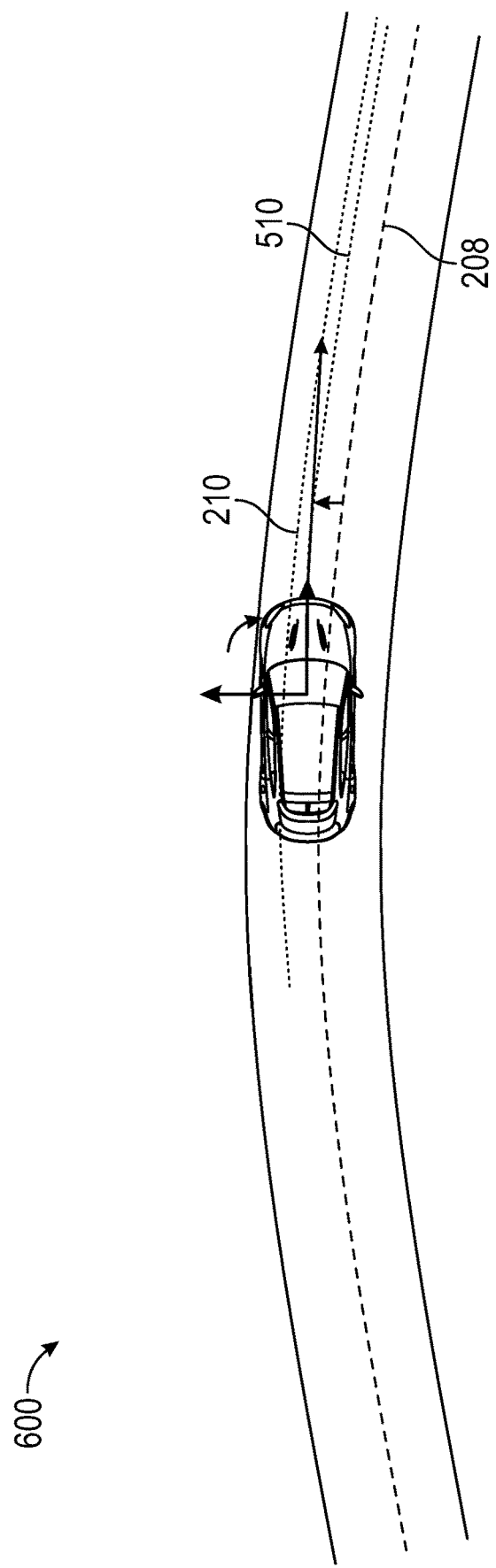
FIG. 6 shows the autonomous vehicle traveling along a second track lane after operation of the methods disclosed herein.

FIG. 6 shows a top view 600 of the road lane 202 with the autonomous vehicle 10 traveling along a final track lane 510 after operation of the methods disclosed herein. The final track lane 510 is located between the initial track lane 210 and the lane center 208.

Figure 7:
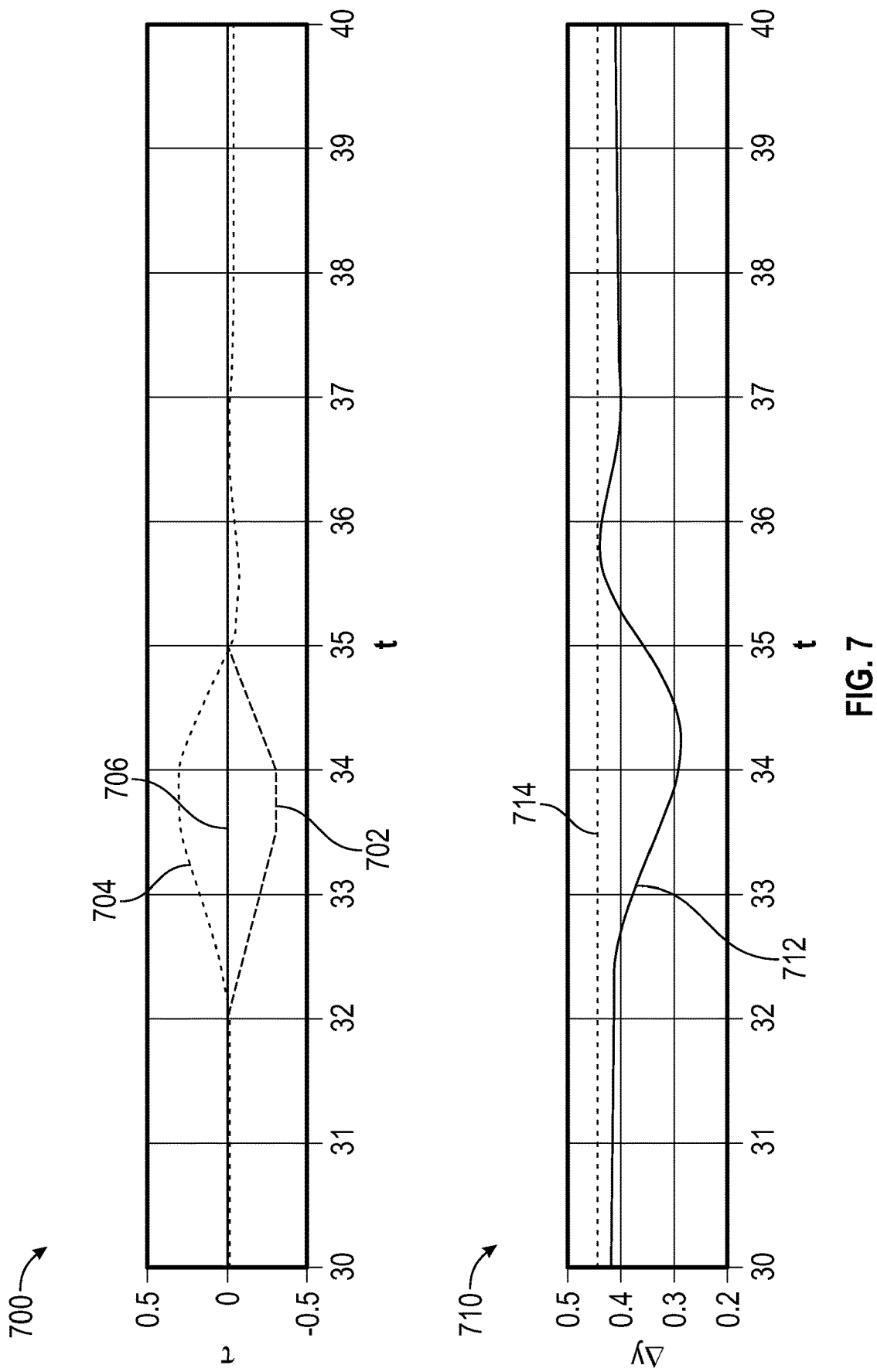
FIG. 7 shows a simulation of dynamic parameters of the autonomous vehicle without the use of the tracking method disclosed herein.

FIG. 7 shows a simulation of dynamic parameters of the autonomous vehicle without the use of the tracking method disclosed herein. A first graph 700 shows various torques applied to the autonomous vehicle 10. Time (in seconds) is shown along the abscissa and torque (in Newton-meters) is shown along the ordinate axis. At time t=32 a disturbance torque 702 is introduced to the autonomous vehicle 10. The disturbance torque reaches a maximum value at about time t=33.5 and maintains this value until about time t=34. From time t=34 to time t=35, the disturbance torque is reduced and disappears at time t=35. From time t=32 to time t=34, the autonomous vehicle 10 exerts a control torque 704 to resist the disturbance torque 702. A driver's input (i.e., driver's torque 706) is not needed.

A second graph 710 shows a lateral offset of the autonomous vehicle 10 from the lane center. Time (in seconds) is shown along the abscissa and lateral offset (in meters) is shown along the ordinate axis. The preview offset 712 is held constant at least throughout the time frame during which the torque is applied (e.g., from t=32 to t=35). The vehicle offset 714 is initially at about 0.42 meters from the lane center. The vehicle offset 714 corrects between the times of about t=32 to about t=34.25, reaching an inflection point at about t=34.25. The vehicle then counter-corrects between about t=34.25 to about t=35.75, move to the outside of its original offset at about t=35.5. This outward motion sends the vehicle towards the lane edge.

Figure 8:
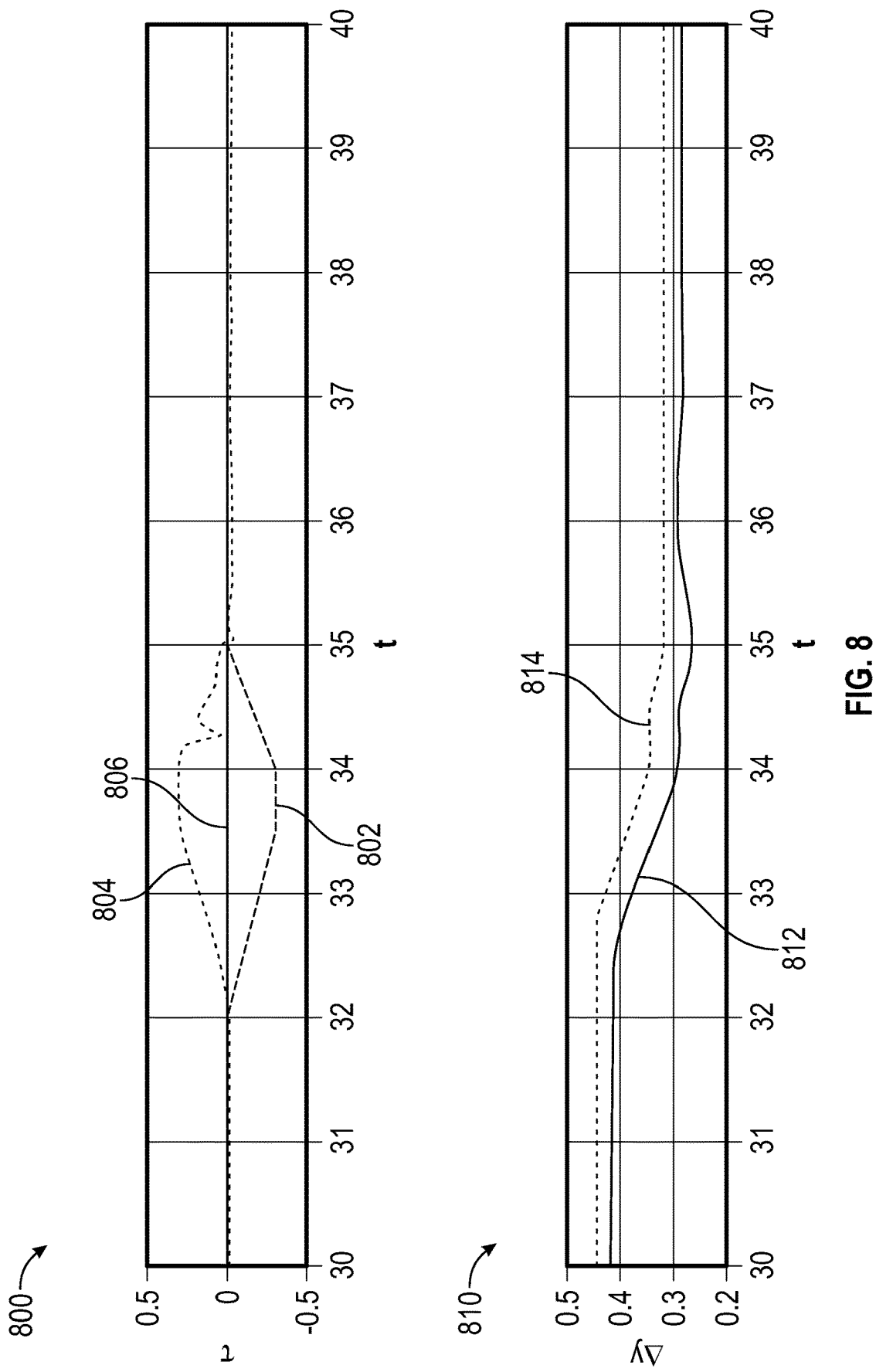
FIG. 8 shows a simulation of various dynamic parameters of the autonomous vehicle using a monotonic tracking method disclosed herein.

FIG. 8 shows a simulation of dynamic parameters of the autonomous vehicle 10 using the monotonic tracking method disclosed herein. A first graph 800 shows various torques applied to the autonomous vehicle 10. Time (in seconds) is shown along the abscissa and torque (in Newton-meters) is shown along the ordinate axis. At time t=32 a disturbance torque 802 is introduced to the autonomous vehicle 10. The disturbance torque reaches a maximum value at about time t=33.5 and maintains this value until about time t=34. From time t=34 to time t=35, the disturbance torque is reduced and disappears at time t=35. From time t=32 to time t=35, the autonomous vehicle 10 exerts a control torque 804 to resist the disturbance torque 702. A driver's input (i.e., driver's torque 806) is not needed.

A second graph 810 shows a lateral offset of the autonomous vehicle 10 from the lane center. Time (in seconds) is shown along the abscissa and lateral offset (in meters) is shown along the ordinate axis. At time t=32, the preview offset 812 is reduced from a initial track lane 210 at about 0.45 meters in response to the introduction of the disturbance torque 802 (between time t=32 and time t=34). From time t=34 to time t=35, as the disturbance torque is removed, the preview offset 812 stabilizes at a final track lane 510 at about 0.28 meters. The vehicle offset 814 moves laterally along with the preview offset 812.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an autonomous vehicle, comprising:
   receiving a disturbance force or yaw moment on the autonomous vehicle that causes a path of the autonomous vehicle to deviate toward a lane center of a road and away from an initial track lane being tracked by the autonomous vehicle, the initial track lane being parallel to the lane center;
   resisting an effect of the disturbance force or yaw moment via a steering torque on the autonomous vehicle by minimizing a tracking error between the path of the autonomous vehicle and the initial track lane, wherein resisting the effect creates an inflection point in the path of the autonomous vehicle;
   establishing a final track lane at a closer of a lateral position of the inflection point and the lane center of the road to the initial track lane; and
   tracking the path to the final track lane.

2. The method of claim 1, wherein the final track lane is between the lane center and the initial track lane.

3. The method of claim 1, further comprising receiving the disturbance force or yaw moment when the autonomous vehicle is making a correction to track the path of the vehicle to the initial track lane from a location outside of the initial track lane.

4. The method of claim 1, further comprising applying a monotonic tracking condition to the vehicle to prevent an increase in an offset between the path of the vehicle and the lane center.

5. The method of claim 1, wherein the disturbance force or yaw moment is transient and externally applied.

6. The method of claim 1, further comprising maintaining tracking of the path to the final track lane when the disturbance force or yaw moment is removed.

7. The method of claim 1, wherein the disturbance force is a gust of wind.

8. A system for operating an autonomous vehicle, comprising:
   a sensor for measuring a position of the autonomous vehicle within a lane of a road with respect to road boundaries and lane markings; and
   a processor configured to:
      resist an effect of a disturbance force or yaw moment via a steering torque on the autonomous vehicle by minimizing a tracking error between a path of the vehicle and an initial track lane, wherein resisting the effect creates an inflection point in the path of the vehicle;
      establish a final track lane at a closer of a lateral position of the inflection point and a lane center to the initial track lane; and
      track the path to the final track lane.

9. The system of claim 8, wherein the final track lane is between the lane center and the initial track lane.

10. The system of claim 8, wherein the disturbance force or yaw moment is received at the autonomous vehicle when the autonomous vehicle is making a correction to the path to track the path to the initial track lane from a location outside of the initial track lane.

11. The system of claim 8, wherein the processor is further configured to enforce a monotonic tracking condition that prevents an increase in an offset between the path of the vehicle and the lane center.

12. The system of claim 8, wherein the disturbance force or yaw moment is transient and externally applied.

13. The system of claim 8, wherein the processor is further configured to maintain tracking of the path to the final track lane when the disturbance force or yaw moment is removed.

14. The system of claim 8, wherein the disturbance force is a gust of wind.

15. An autonomous vehicle, comprising:
   a sensor for measuring a position of the autonomous vehicle within a lane of a road and with respect to road boundaries and lane markings; and
   a processor configured to:
      resist an effect of a disturbance force or yaw moment via a steering torque on the autonomous vehicle by minimizing a tracking error between a path of the vehicle and an initial track lane, wherein resisting the effect creates an inflection point in the path of the vehicle;
      establish a final track lane at a closer of a lateral position of the inflection point and a lane center to the initial track lane; and
      track the path to the final track lane.

16. The autonomous vehicle of claim 15, wherein the final track lane is between the lane center and the initial track lane.

17. The autonomous vehicle of claim 15, wherein the disturbance force or yaw moment is received at the autonomous vehicle when the autonomous vehicle is making a correction to the path to track the path to the initial track lane from a location outside of the initial track lane.

18. The autonomous vehicle of claim 15, wherein the processor is further configured to enforce a monotonic tracking condition that prevents an increase in an offset between the path of the vehicle and the lane center.

19. The autonomous vehicle of claim 15, wherein the disturbance force or yaw moment is transient and externally applied.

20. The autonomous vehicle of claim 15, wherein the processor is further configured to maintain tracking of the path to the final track lane when the disturbance force or yaw moment is removed.

* * * * *